United States Patent
Kuang

(10) Patent No.: US 9,608,510 B2
(45) Date of Patent: Mar. 28, 2017

(54) SWITCHING REGULATOR AND THE METHOD THEREOF

(71) Applicant: Chengdu Monolithic Power Systems Co., Ltd., Chengdu (CN)

(72) Inventor: Naixing Kuang, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 0 days.

(21) Appl. No.: 14/944,111

(22) Filed: Nov. 17, 2015

(65) Prior Publication Data
US 2016/0156260 A1  Jun. 2, 2016

(30) Foreign Application Priority Data
Dec. 2, 2014 (CN) .......................... 2014 1 0720044

(51) Int. Cl.
  H02M 1/32 (2007.01)
  H03M 3/04 (2006.01)
(52) U.S. Cl.
  CPC .................................... *H02M 1/32* (2013.01)

(58) Field of Classification Search
  CPC .................................. H02M 1/32; H02M 3/04
  See application file for complete search history.

(56) References Cited

U.S. PATENT DOCUMENTS

| | | | |
|---|---|---|---|
| 6,522,115 B1* | 2/2003 | Greitschus | G05F 1/613 323/222 |
| 2003/0172103 A1* | 9/2003 | Feldtkeller | H02M 1/12 708/819 |
| 2011/0089918 A1* | 4/2011 | Chang | H02M 3/156 323/282 |
| 2011/0316511 A1* | 12/2011 | Wang et al. | H02M 3/156 323/285 |
| 2012/0206122 A1* | 8/2012 | Dhuyvetter | H02M 3/1563 323/311 |
| 2013/0307508 A1* | 11/2013 | Hallak | H02M 3/1582 323/282 |
| 2014/0071720 A1 | 3/2014 | Ouyang et al. | |
| 2014/0354159 A1 | 12/2014 | Zhang et al. | |

* cited by examiner

Primary Examiner — Jue Zhang

(57) ABSTRACT

A switching regulator uses an over voltage comparator to compare an envelop line signal with a reference wave signal, to detect whether the system is in an over voltage condition. The envelop line signal is indicative of a peak value of an inductor current.

5 Claims, 4 Drawing Sheets

SWITCHING REGULATOR AND THE METHOD THEREOF

CROSS-REFERENCE TO RELATED APPLICATIONS

This application claims priority to and the benefit of Chinese Patent Application No. 201410720044.1, filed Dec. 2, 2014, which is incorporated herein by reference in its entirety.

FIELD

The present invention relates to electronic circuits, more specifically, the present invention relates to switching regulators and the method thereof.

BACKGROUND

Over voltage protection is a basic requirement for switching regulators to insure the safety of components in some extreme conditions. So in switching regulators, it is needed to detect the output voltage. However, when the output (load) has a reference ground different to the control chip, an auxiliary-winding or some external components on the output side is needed to detect the output voltage, which increases cost and complicates the external circuit.

SUMMARY

A switching regulator detecting whether the system is in an over voltage condition by comparing an envelop line signal with a reference wave signal, the envelop line signal being indicative of a peak value of an inductor current. Few external components are needed.

The use of the similar reference label in different drawings indicates the same of like components.

DETAILED DESCRIPTION

Embodiments of circuits for switching regulators are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
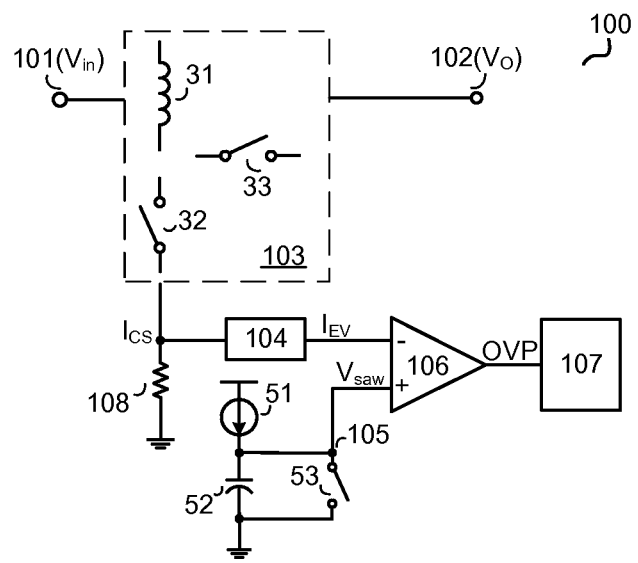
FIG. 1 schematically shows a switching regulator 100 in accordance with an embodiment of the present invention.

FIG. 1 schematically shows a switching regulator 100 in accordance with an embodiment of the present invention. In the example of FIG. 1, the switching regulator 100 comprises: an input port 101, configured to receive an input voltage $V_{in}$; an output port 102, configured to provide an output voltage $V_O$; a power converter 103, coupled between the input port 101 and the output port 102, the power converter 103 including an inductor 31, a main power switch 32 and a secondary power switch 33, wherein the inductor 31 is configured to gain energy from the input voltage $V_{in}$ when the main power switch 32 is ON and the secondary power switch 33 is OFF, and the inductor 31 is configured to be freewheeled via the secondary power switch 33 and to deliver power to the output port 102 when the main power switch 32 is OFF; an envelop line unit 104, coupled to the power converter 103 to receive a current sense signal $I_{CS}$ indicative of a current flowing through the inductor 31 (the inductor current), to generate an envelop line signal $I_{EV}$ indicative of the peak value of the current sense signal $I_{CS}$; a reference wave node 105, configured to provide a reference wave signal $V_{saw}$; a charge current source 51, coupled between a power supply and the reference wave node 105; a charge capacitor 52 and a reset switch 53, coupled between the reference wave node 105 and a reference ground in parallel; an over voltage comparator 106, having a first input terminal coupled to the envelop line unit 104 to receive the envelop line signal $I_{EV}$, a second input terminal coupled to the reference wave node 105 to receive the reference wave signal $V_{saw}$, and an output terminal configured to generate an over voltage detected signal OVP based on the envelop line signal $I_{EV}$ and the reference wave signal $V_{saw}$; and a controller 107, coupled to the over voltage comparator 106 to receive the over voltage detected signal OVP, to generate a control signal, so as to execute over voltage protection when the switching regulator 100 is in an over voltage condition; wherein a voltage drop across the charge capacitor 52 is the reference wave signal $V_{saw}$; and the reset switch 53 and the main power switch 32 are ON and OFF synchronously. That is, when the main power switch 32 is ON, the reset switch is also ON; when the main power switch 32 is OFF, the reset switch 53 is also OFF.

In one embodiment, the switching regulator 100 further comprises a sense resistor 108 coupled to the main power switch 32, wherein a voltage drop across the sense resistor 108 represents the current sense signal $I_{CS}$.

In one embodiment, the power converter 103 operates at boundary mode, the output voltage $V_O$ is proportional to the peak value $I_{PK}$ of the inductor current, and is inversely proportional to an off time $t_{off}$ of the main power switch 32, i.e.:

$$V_O = k \times \frac{I_{PK}}{t_{off}}$$

wherein k is a coefficient.

During the operation of the switching regulator 100, when the main power switch 32 and the reset switch 53 are ON, the inductor 31 gains energy from the input voltage $V_{in}$. Accordingly, the inductor current starts to increase from zero (i.e., the current sense signal $I_{CS}$ starts to increase from zero); and the voltage drop across the charge capacitor 52 is reset to zero. After a certain period, the main power switch 32 and the reset switch 53 are OFF. Accordingly, the inductor current increases to its peak value (i.e., the current sense signal $I_{CS}$ increases to its maximum value), and the voltage drop across the charge capacitor 52 (i.e., the reference wave signal $V_{saw}$) starts to increase from zero. The envelop line unit 104 locks the maximum value of the current sense signal $I_{CS}$, to generate the envelop line signal $I_{EV}$. If during the off time $t_{off}$ of the main power switch 32, the voltage drop across the charge capacitor 52 increases to be higher than the envelop line signal $I_{EV}$, i.e. if $$V_{saw} = \frac{I_{51} \times t_{off}}{C_{52}} > I_{EV} = I_{PK} \times R_{108} \quad (1)$$

wherein $I_{51}$ represents the current value of the charge current source 51, $C_{52}$ represents the capacitance of the charge capacitor 52, $R_{108}$ represents the resistance of the sense resistor 108, $I_{PK}$ represents the peak value of the inductor current.

$$=> \frac{I_{PK}}{t_{off}} < \frac{I_{51}}{C_{52} \times R_{108}} \quad (2)$$

Then $$V_O = k \times \frac{I_{PK}}{t_{off}} < \frac{k \times I_{51}}{C_{52} \times R_{108}}$$

On the contrary, If during the off time $t_{off}$ of the main power switch 32, the voltage drop across the charge capacitor 52 is lower than the envelop line signal $I_{EV}$, i.e. if $$V_{saw} = \frac{I_{51} \times t_{off}}{C_{52}} < I_{EV} = I_{PK} \times R_{108} \quad (3)$$

$$=> V_O = k \times \frac{I_{PK}}{t_{off}} > \frac{k \times I_{51}}{C_{52} \times R_{108}} \quad (4)$$

So if $I_{51}$, $C_{52}$, $R_{108}$ and k are set according to actual application, it is easy to detect whether the output voltage $V_O$ is over voltage or not by formula (2) or by formula (4). For example, if the output voltage is set not to be higher than 180V (i.e., the over voltage point is 180V) in application, then setting:

$$\frac{k \times I_{51}}{C_{52} \times R_{108}} = 180 \text{ V}$$

According to formula (2) or formula (4), if the envelop line signal $I_{EV}$ is lower than the voltage drop across the charge capacitor 52 (the reference wave signal $V_{saw}$), the output voltage $V_O$ is lower than 180V, which means there is no over voltage condition, and no over voltage protection is needed; if the envelop line signal $I_{EV}$ is higher than the voltage drop across the charge capacitor 52 (the reference wave signal $V_{saw}$), the output voltage $V_O$ is higher than 180V, which means there happens an over voltage condition, and the controller 107 would execute over voltage protection.

Figure 2:
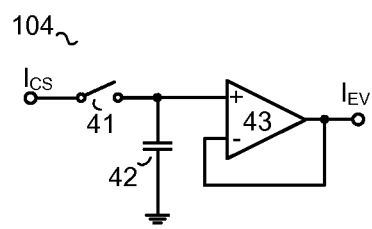
FIG. 2 schematically shows a circuit configuration of the envelop line unit 104 in accordance with an embodiment of the present invention.

FIG. 2 schematically shows a circuit configuration of the envelop line unit 104 in accordance with an embodiment of the present invention. In the example of FIG. 2, the envelop line unit 104 comprises a sample and hold circuit. Specifically speaking, the envelop unit 104 comprises: a sample switch 41, having a first end and a second end, wherein the first end is configured to receive the current sense signal $I_{CS}$; a sample capacitor 42, coupled between the second end of the sample switch 41 and the reference ground; and an operational amplifier 43, having a first input terminal, a second input terminal and an output terminal, wherein the first input terminal is coupled to the second end of the sample switch 41, the second input terminal is coupled to the output terminal, and the envelop line signal $I_{EV}$ is provided at the output terminal of the operational amplifier 43.

Figure 3:
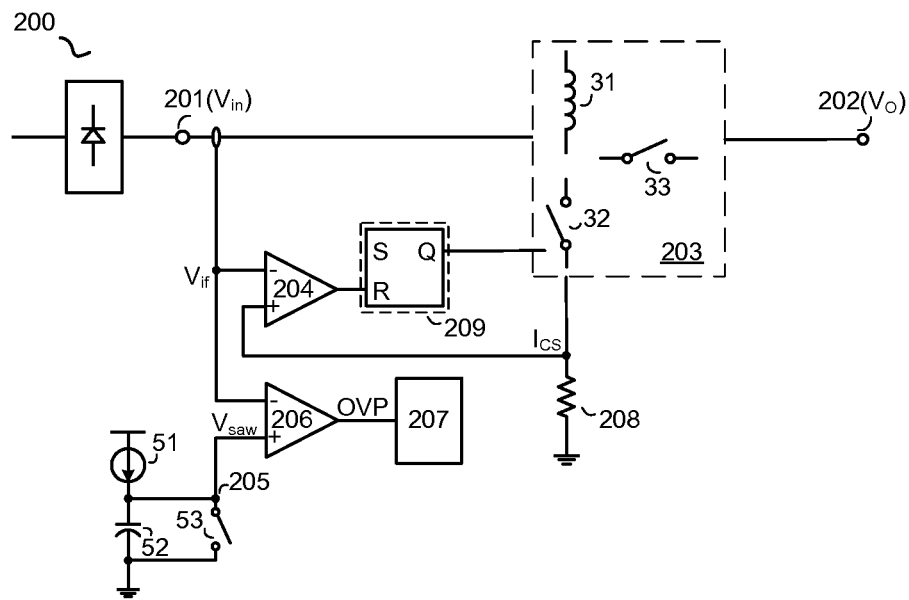
FIG. 3 schematically shows a switching regulator 200 in accordance with an embodiment of the present invention.

FIG. 3 schematically shows a switching regulator 200 in accordance with an embodiment of the present invention. In the example of FIG. 3, the switching regulator 200 comprises: an input port 201, configured to receive an input voltage $V_{in}$, the input voltage $V_{in}$ is an AC input voltage or a rectified DC voltage after a bridge rectifier (as shown); an output port 202, configured to provide an output voltage $V_O$; a power converter 203, coupled between the input port 201 and the output port 202, the power converter 203 including an inductor 31, a main power switch 32 and a secondary power switch 33, wherein the inductor 31 is configured to gain energy from the input voltage $V_{in}$ when the main power switch 32 is ON and the secondary power switch 33 is OFF, and the inductor 31 is configured to be freewheeled via the secondary power switch 33 and to deliver power to the output port 202 when the main switch 32 is OFF; a current comparator 204, having a first input terminal configured to receive a voltage feed forward signal $V_{if}$ indicative of the input voltage $V_{in}$, a second input terminal coupled to the power converter 203 to receive a current sense signal $I_{CS}$ indicative of a current flowing through the inductor 31 (the inductor current), and an output terminal configured to generate a reset signal based on the voltage feed forward signal $V_{if}$ and the current sense signal $I_{CS}$; a RS flip flop 209, having a reset terminal R coupled to the output terminal of the current comparator 204 to receive the reset signal, to turn off the main power switch 32 when the current sense signal $I_{CS}$ reaches the voltage feed forward signal $V_{if}$; a reference wave node 205, configured to provide a reference wave signal $V_{saw}$; a charge current source 51, coupled between a power supply and the reference wave node 205; a charge capacitor 52 and a reset switch 53, coupled between the reference wave node 205 and a reference ground in parallel; an over voltage comparator 206, having a first input terminal configured to receive the voltage feed forward signal $V_{if}$, a second input terminal coupled to the reference wave node 205 to receive the reference wave signal $V_{saw}$, and an output terminal configured to generate an over voltage detected signal OVP based on the voltage feed forward signal $V_{if}$ and the reference wave signal $V_{saw}$; and a controller 207, coupled to the over voltage comparator 206 to receive the over voltage detected signal OVP, to generate a control signal, so as to execute over voltage protection when the switching regulator 200 is in an over voltage condition; wherein a voltage drop across the charge capacitor 52 is the reference wave signal $V_{saw}$; and the reset switch 53 and the main power switch 32 are ON and OFF synchronously.

In the example of FIG. 3, when the current sense signal $I_{CS}$ reaches the voltage feed forward signal $V_{if}$, the RS flip flop 209 would turn off the main power switch 32. So the voltage feed forward signal $V_{if}$ is equals to the envelop line of the current sense signal $I_{CS}$.

The operation principle of the switching regulator 200 in FIG. 3 is similar to that of the switching regulator 100 in FIG. 1.

Figure 4:
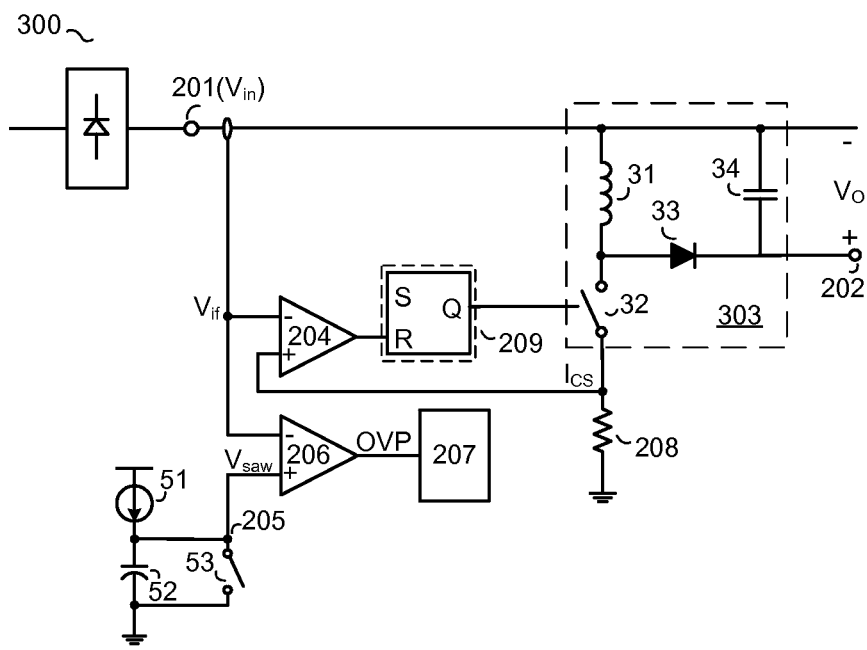
FIG. 4 schematically shows a switching regulator 300 in accordance with an embodiment of the present invention.

In one embodiment, the power converter comprises a buck-boost converter. As shown in FIG. 4, a switching regulator 300 in accordance with an embodiment of the present invention is shown. In the example of FIG. 4, the power converter 303 comprises a buck-boost converter. Specifically speaking, the power converter 303 comprises: an inductor 31, having a first end and a second end, wherein the first end is coupled to the input port 201; a main power switch 32, coupled between the second end of the inductor 31 and the reference ground; a secondary power switch 33, coupled between the second end of the inductor 31 and the output port 202; and an output capacitor 34, coupled between the input port 201 and the output port 202; wherein a voltage difference between the input port 201 and the output port 202 is the output voltage $V_O$.

The configuration of other circuits in the switching regulator 300 in FIG. 4 is similar to that in the switching regulator 200 in FIG. 3.

In one embodiment, the secondary power switch 33 comprises a power diode.

Figure 5:
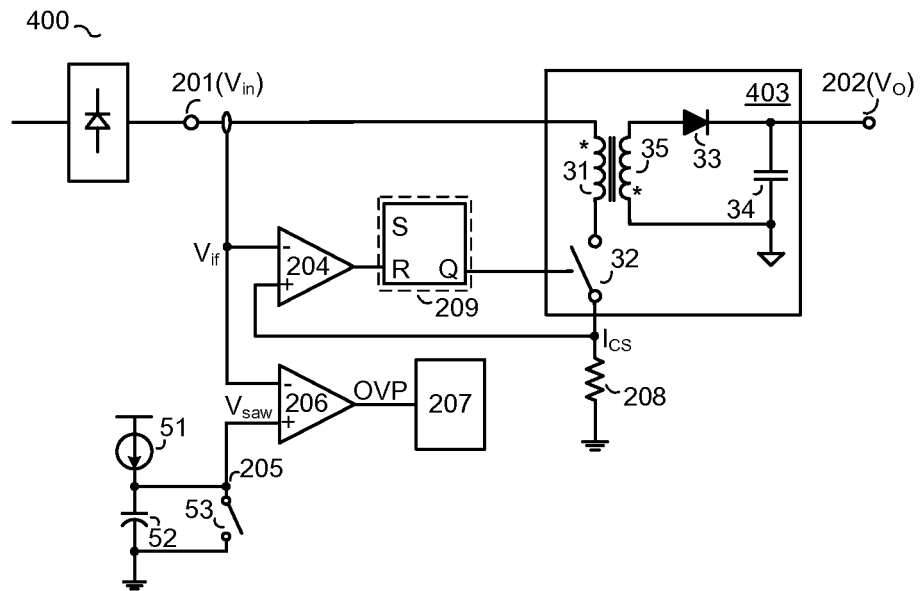
FIG. 5 schematically shows a switching regulator 400 in accordance with an embodiment of the present invention.

In one embodiment, the power converter comprises a flyback converter. As shown in FIG. 5, a switching regulator 400 in accordance with an embodiment of the present invention is shown. In the example of FIG. 5, the power converter 403 comprises a flyback converter. Specifically speaking, the power converter 403 comprises: an inductor (a primary winding) 31 and a main power switch 32, coupled in series between the input port 201 and a primary reference ground; a secondary winding 35 and a secondary power switch 33, coupled in series between the output port 202 and a secondary reference ground; and an output capacitor 34, coupled between the output port 202 and a secondary reference ground. The configuration of other circuits in the switching regulator 400 in FIG. 5 is similar to that in the switching regulator 200 in FIG. 3.

Figure 6:
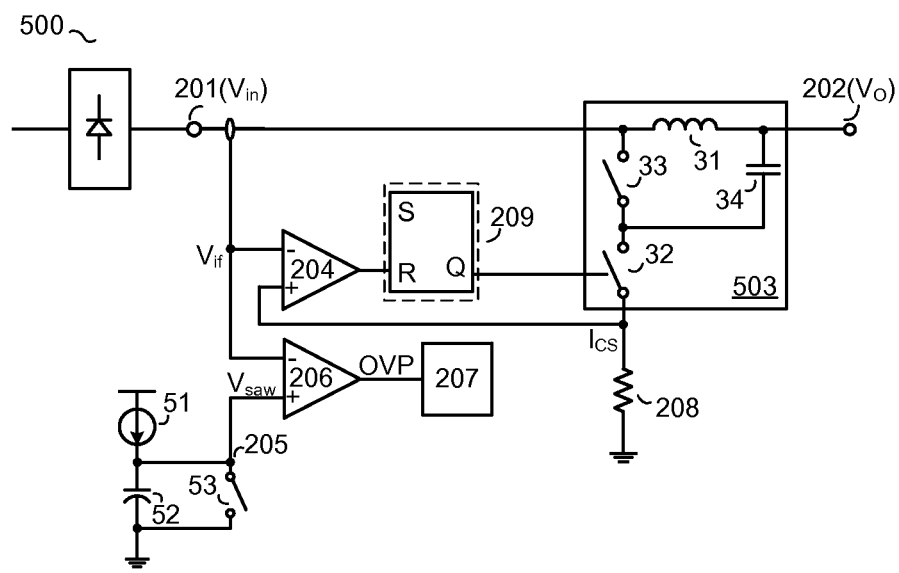
FIG. 6 schematically shows a switching regulator 500 in accordance with an embodiment of the present invention.

In one embodiment, the power converter comprises a buck converter. As shown in FIG. 6, a switching regulator 500 in accordance with an embodiment of the present invention is shown. In the example of FIG. 6, the power converter 503 comprises a buck converter with low-side configuration. However, one skilled in the art should realize that the buck converter may also be in high-side configuration.

The configuration of other circuits in the switching regulator 500 in FIG. 6 is similar to that in the switching regulator 200 in FIG. 3.

Several embodiments of the foregoing switching regulator obtain the output voltage information through the relationship of the output voltage and the off time of the main power switch by very simple circuit, which highly simplifies the voltage detection.

Figure 7:
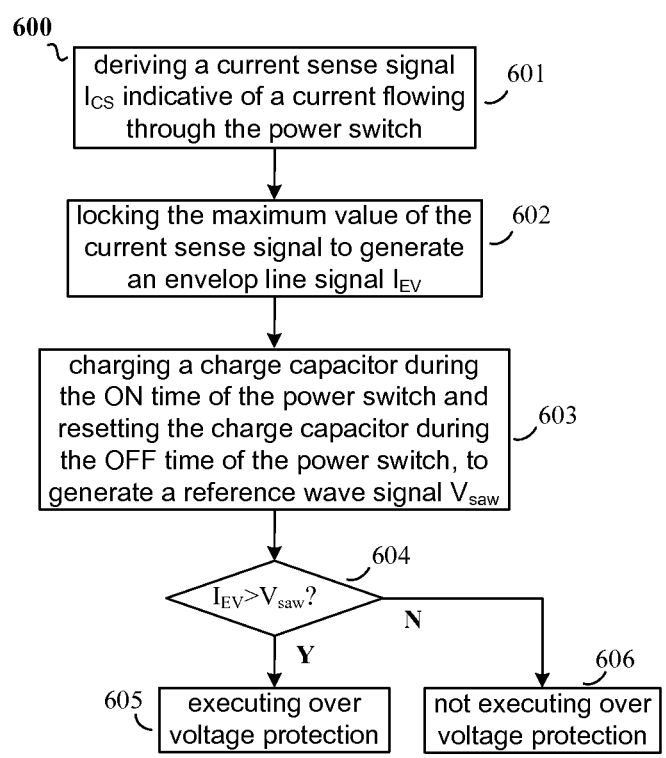
FIG. 7 schematically shows a method 600 used for a switching regulator in accordance with an embodiment of the present invention.

FIG. 7 schematically shows a method 600 used for a switching regulator in accordance with an embodiment of the present invention, the switching regulator being configured to receive an input voltage to generate an output voltage, the switching regulator including a power switch which has ON time and OFF time in a switching cycle, the output voltage being inversely proportional to the OFF time of the power switch, the method comprises:

Step 601, deriving a current sense signal $I_{CS}$ indicative of a current flowing through the power switch.

Step 602, locking the maximum value of the current sense signal to generate an envelop line signal $I_{EV}$.

Step 603, charging a charge capacitor during the ON time of the power switch and resetting the charge capacitor during the OFF time of the power switch, to generate a reference wave signal $V_{saw}$.

Step 604, comparing the envelop line signal $I_{EV}$ with the reference wave signal Vsaw: going to step 605 if the envelop line signal $I_{EV}$ is higher than the reference wave signal $V_{saw}$; going to step 606 if the envelop line signal $I_{EV}$ is lower than the reference wave signal $V_{saw}$.

Step 605, the switching regulator is in an over voltage condition, executing over voltage protection.

Step 606, the switching regulator is not in the over voltage condition, not executing over voltage protection.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A switching regulator, comprising:
an input port, configured to receive an input voltage;
an output port, configured to provide an output voltage;
a power converter, coupled between the input port and the output port, the power converter including an inductor, a main power switch and a secondary power switch;
a current comparator, having a first input terminal configured to receive a voltage feed forward signal indicative of the input voltage, a second input terminal coupled to the power converter to receive a current sense signal indicative of an inductor current, and an output terminal configured to generate a reset signal based on the voltage feed forward signal and the current sense signal;
a RS flip flop, having a reset terminal coupled to the output terminal of the current comparator to receive the reset signal, to turn off the main power switch when the current sense signal reaches the voltage feed forward signal;
an over voltage comparator, having a first input terminal configured to receive the voltage feed forward signal, a second input terminal configured to receive a reference wave signal, and an output terminal configured to generate an over voltage detected signal based on the voltage feed forward signal and the reference wave signal; and
a controller, coupled to the over voltage comparator to receive the over voltage detected signal, to generate a control signal, so as to execute over voltage protection when the switching regulator is in an over voltage condition.

2. The switching regulator of claim 1, further comprising:
a reference wave node, configured to provide the reference wave signal;
a charge current source, coupled between a power supply and the reference wave node; and
a charge capacitor and a reset switch, coupled between the reference wave node and a reference ground in parallel;

wherein the reset switch and the main power switch are ON and OFF synchronously.

3. The switching regulator of claim 1, wherein the power converter is configured to operate at boundary mode; and the output voltage is proportional to a peak value of the inductor current, and is inversely proportional to an off time of the main power switch.

4. The switching regulator of claim 1, wherein the power converter comprise:

the inductor, having a first end and a second end, wherein the first end is coupled to the input port;

the main power switch, coupled between the second end of the inductor and the reference ground;

the secondary power switch, coupled between the second end of the inductor and the output port; and an output capacitor, coupled between the input port and the output port; wherein a voltage difference between the input port and the output port is the output voltage.

5. The switching regulator of claim 1, wherein the power converter comprise:

the inductor and the main power switch, coupled in series between the input port and a primary reference ground; wherein the inductor comprises a primary winding;

a secondary winding and the secondary power switch, coupled in series between the output port and a secondary reference ground; and an output capacitor, coupled between the output port and a secondary reference ground.

* * * * *